(12) United States Patent
Pfund et al.

(10) Patent No.: US 9,236,738 B2
(45) Date of Patent: Jan. 12, 2016

(54) CONTROL SYSTEM FOR USE WITH ONE OR MORE BUILDING POWER CIRCUITS

(71) Applicant: SYLVAN R. SHEMITZ DESIGNS INCORPORATED, West Haven, CT (US)

(72) Inventors: David R. Pfund, Woodbridge, CT (US); Paul R. Ford, Orange, CT (US)

(73) Assignee: SYLVAN R. SHEMITZ DESIGNS, LLC, West Haven, CT (US)

( * ) Notice: Subject to any disclaimer, the term of this patent is extended or adjusted under 35 U.S.C. 154(b) by 204 days.

(21) Appl. No.: 13/786,960

(22) Filed: Mar. 6, 2013

(65) Prior Publication Data
US 2014/0077728 A1    Mar. 20, 2014

Related U.S. Application Data

(60) Provisional application No. 61/608,484, filed on Mar. 8, 2012.

(51) Int. Cl.
*H05B 37/02* (2006.01)
*H02J 3/00* (2006.01)

(52) U.S. Cl.
CPC . *H02J 3/00* (2013.01); *H05B 37/02* (2013.01); *H05B 37/0218* (2013.01); *H05B 37/0227* (2013.01); *H05B 37/0245* (2013.01); *H05B 37/0272* (2013.01); *Y10T 307/25* (2015.04); *Y10T 307/406* (2015.04); *Y10T 307/461* (2015.04)

(58) Field of Classification Search
CPC ... H02J 3/00; H05N 37/0209; H05N 37/0218; H05N 37/0245; H05N 37/0272
See application file for complete search history.

(56) References Cited

U.S. PATENT DOCUMENTS

| | | | |
|---|---|---|---|
| 6,379,164 B1 | 4/2002 | Cash, Jr. | |
| 6,995,525 B2 * | 2/2006 | Barthelmess | 315/323 |
| 7,812,543 B2 * | 10/2010 | Budike, Jr. | 315/157 |
| 8,258,412 B2 | 9/2012 | Hayes et al. | |
| 8,427,006 B2 * | 4/2013 | Gilbert | 307/18 |
| 8,749,093 B2 * | 6/2014 | Lee et al. | 307/38 |
| 2007/0273307 A1 | 11/2007 | Westrick et al. | |
| 2010/0052574 A1 | 3/2010 | Blakeley et al. | |
| 2011/0012433 A1 | 1/2011 | Parsons | |
| 2012/0001487 A1 | 1/2012 | Passina | |

FOREIGN PATENT DOCUMENTS

| | | |
|---|---|---|
| AU | 2010101028 A4 | 10/2010 |
| DE | 29814109 U1 | 11/1998 |
| GB | 2425225 A | 10/2006 |

OTHER PUBLICATIONS

LMIR-100 Digital IR Ceiling Mount Receiver Pub. No. 31701 rev. Aug. 2009, www.wattstopper.com.
EP Search Report dated Feb. 4, 2015, Application No. 13158325.4-1804.

* cited by examiner

*Primary Examiner* — Jeffrey Zweizig
(74) *Attorney, Agent, or Firm* — Cantor Colburn LLP

(57) ABSTRACT

Disclosed is a control system for use with one or more building power circuits, the control system including a control device delimited by a control device housing, the control device being configured to receive power from the building power circuits and provide power to at least one power output, and a receiver configured to receive radio frequency signals, the receiver being disposed remote of the control device housing and configured for removable wired connection with the control device.

19 Claims, 5 Drawing Sheets

CONTROL SYSTEM FOR USE WITH ONE OR MORE BUILDING POWER CIRCUITS

CROSS-REFERENCE TO RELATED APPLICATIONS

This application is related to and claims the benefit of U.S. Provisional Patent Application Ser. No. 61/608,484 filed on Mar. 8, 2012, the entire contents of which are herein incorporated by reference.

FIELD

The disclosure generally relates to a control system, and more particularly to a control system for use with one or more building power circuits.

BACKGROUND

In the interest of energy conservation and given the proliferation of portable plug-in electrical devices used in offices, there is a growing need for control of convenience power receptacles and/or receptacle circuits deployed in offices. This especially applies to power receptacles deployed in association with portable and modular office furniture. The need is further elevated by energy conservation legislation that requires the implementation of such control in buildings. However, notwithstanding the need to implement switching control of office power receptacle circuits, it is equally desirable, and at the same time necessary, to provide unswitched convenience power in offices for devices that must remain energized on a 24-hour schedule. These devices include networked personal computers and the like.

The current art includes circuit controllers that are wired in association with building wiring and modular wiring to provide on/off control of circuits that may include one or more plug load or convenience power receptacles controlled in response to signals received at the controller via a digital data link and/or from one or more sensors connected to the controller. However, a disadvantage of such controllers is the lack of a wireless (i.e. radio frequency) input and thus the need for access to a wired data or signal link when interfaced with remote sensors, sensor networks, and/or building energy management systems.

In addition, the current art currently includes circuit controllers that are wired in association with power wiring so as to provide on/off control of circuits inclusive of one or more convenience power receptacles in response to signals received from one or more sensors connected directly to the controller and via radio frequency transmissions from remote sensors, sensor networks and/or building energy management systems received via an imbedded radio receiver. However, one disadvantage of such controllers with embedded radio receivers is their inability to detect or "hear," and reliably respond to, wireless control commands when said controllers and receivers are disposed in the context of modular, plug-and-play multi-circuit power systems such as those deployed in modular furniture and the like.

The current art further includes portable controllers powered by a cord and plug, which provide dimming control of one or more controllable luminaires via plug-and-play connectors and plug-and-play cabling, wherein the diming occurs in response to sensors connected to the controller via plug-and-play connections and via radio frequency transmissions from remote sensors, sensor networks, and/or building energy management systems received via an imbedded radio receiver. However, one disadvantage of such controllers is the lack off an ability to desirably control (i.e. energize and de-energize) circuits that may include one or more convenience power receptacles.

The current art still further includes portable controllers powered by a cord and plug, which provide switching control of one or more portable electrical appliances via plug-and-play connections, the control occurring in response to radio frequency transmissions from remote sensors, sensor networks, and/or building energy management systems received via an imbedded radio receiver. However, such controllers lack the ability to inherently establish a desirable mix of controlled convenience power receptacles and uncontrolled convenience power receptacles associated with portable office furniture systems.

SUMMARY

Disclosed is a control system for use with one or more building power circuits, the control system including a control device delimited by a control device housing, the control device being configured to receive power from the building power circuits and provide power to at least one power output, and a receiver configured to receive radio frequency signals, the receiver being disposed remote of the control device housing and configured for removable wired connection with the control device.

Disclosed is a control system for use with one or more building power circuits, the control system including a first control device portion delimited by a first portion housing, the first control device portion being configured to receive power from the building power circuits and provide power to at least one power output, a second control device portion delimited by a second portion housing remote of the first housing portion, wherein the second control device portion includes a receiver configured to receive signals, the second control device portion being in wired connection with the first control device portion, at least one switch circuit disposed in the first portion housing and configured to provide switched power to one or more of the at least one power output, an auxiliary power supply disposed in the first portion housing and configured to provide power to the second control device portion via the wired connection, and a controller disposed in the second portion housing, the controller being configured for at least one of connection with and control of the receiver, the switch circuit, and the auxiliary power supply.

BRIEF DESCRIPTION OF THE FIGURES

The foregoing and other features and advantages of the present invention should be more fully understood from the following detailed description of illustrative embodiments taken in conjuncture with the accompanying Figures in which like elements are numbered alike in the several FIGS..

DETAILED DESCRIPTION

Figure 1:
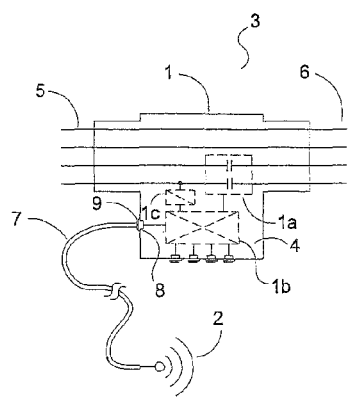
FIG. 1 is a schematic view of a controller system in accordance with an exemplary embodiment of the disclosure.

FIG. 1 best illustrates an exemplary control device 1 and receiver 2 of a control system 3 for use with one or more building power circuits (not shown in FIG. 1). As shown in FIG. 1, the control device, which is defined by a control housing 4, is configured for receiving power from the building via wiring 5, and is also configured to provide power to at least one power output via wiring 6. The control device includes various control elements including a switch circuit 1a (such as one or more switching relays), a controller or circuit board 1b (which controls the switch circuit and perhaps the receiver/transceiver), and an auxiliary element 1c for providing auxiliary power to the controller 1b. Use and configuration of this control system 3 with various inputs, outputs, and sensors will be discussed later in the disclosure.

As shown in FIG. 1, the receiver 2 of the system 3 is remote of the control device housing 4, and disposed in removable wired connection with the control device 1 via a flexible extension 7. This wired connection via extension 7 is removable in the sense that the extension 7 and housing 4 are configured for quick-connect/quick-disconnect plugging connection at port 8 of the housing 4. In other words, the receiver 2 and control device 1 of the system 3 are configured for plug-and-play connections, and any reference to "quick-connect/quick-disconnect plugging connection" in this disclosure can be defined as and synonymous with a plug-and-play connection.

Advantageously, the receiver 2, which is a radio frequency receiver in an exemplary embodiment, is positionable independently of control device 1 by means of the flexible extension 7. This allows control device 1, inclusive of switch circuit 1a, to be disposed within any constructions (even those that are known to attenuate radio frequency signals such as the cavities of electrified modular office furniture systems and the like), and to be of electrically grounded metallic construction, and thus, to be configured as an integral part of a modular furniture wiring system. Similarly, this allows receiver 2 to be disposed in a position favorable for receiving radio signals. The receiver 2 may be enclosed in a housing penetrable by radio frequency signals and include a radio receiver or transceiver and an associated antenna, or simply the antenna associated with an imbedded radio receiver. Furthermore, flexible extension 7 may be a shielded cable that prevents induced signals (such as radio signals) along its length, and plug-and-play connector 9 may be provided to facilitate connection and interchangeability of flexible extension 7 with the port 8 or other flexible connections that may vary in length or cable type or may include other receivers 2 of various form factors, radio sensitivities, signal directionalities, or the like. Indeed, the extension 7 may be or configured to be of any length desirable for system use.

The control device 1 and receiver 2 of the system 3 as discussed above may be used in various configurations. These configurations will be discussed hereinbelow with reference to FIGS. 2-10.

Figure 2:
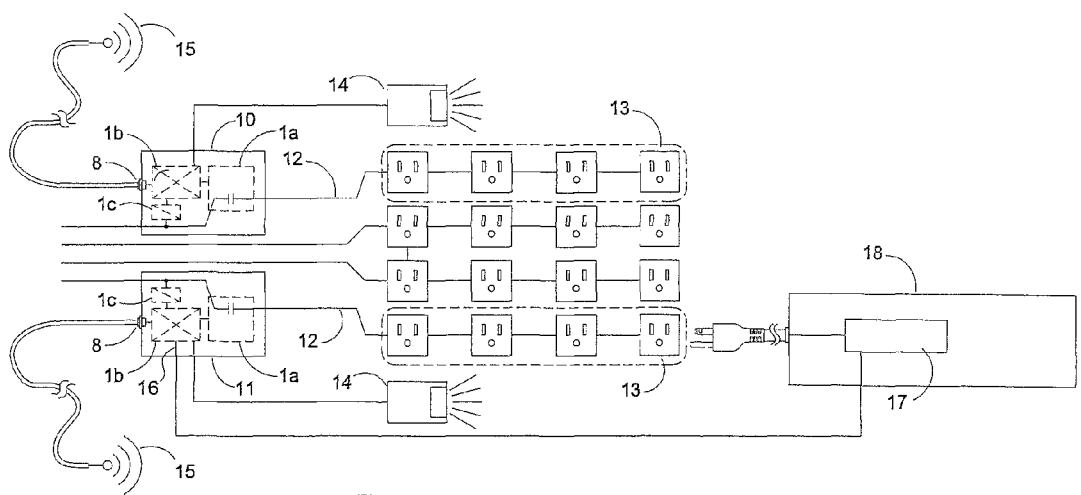
FIG. 2 is a schematic view of another controller system in accordance with another exemplary embodiment of the disclosure.

FIG. 2 discloses control devices 10 and 11 (similar to the control device 1 shown in FIG. 1), which each include the switch circuit 1a, controller 1b, and auxiliary element 1c discussed above. Each control device 10 and 11 is in wired in association with power output wiring 12 (similar to wiring 6 of FIG. 1) so as to provide on/off control of circuits that may include one or more convenience power receptacles 13 in response to signals received at the controller from one or more sensors 14 (e.g. motion sensors) connected directly to the controller and/or via radio frequency transmissions from remote sensors, sensor networks, and/or building energy management systems received via plug-and-play receivers 15 (similar to the receiver 2 of FIG. 1). Each of the control devices 10 and 11 is dedicated to switch a circuit and may provide analog 0-10V dimming control, whereby a control output 16 of the controller 11 is wired directly to a controllable ballast or driver 17 in a luminaire 18.

Figure 3:
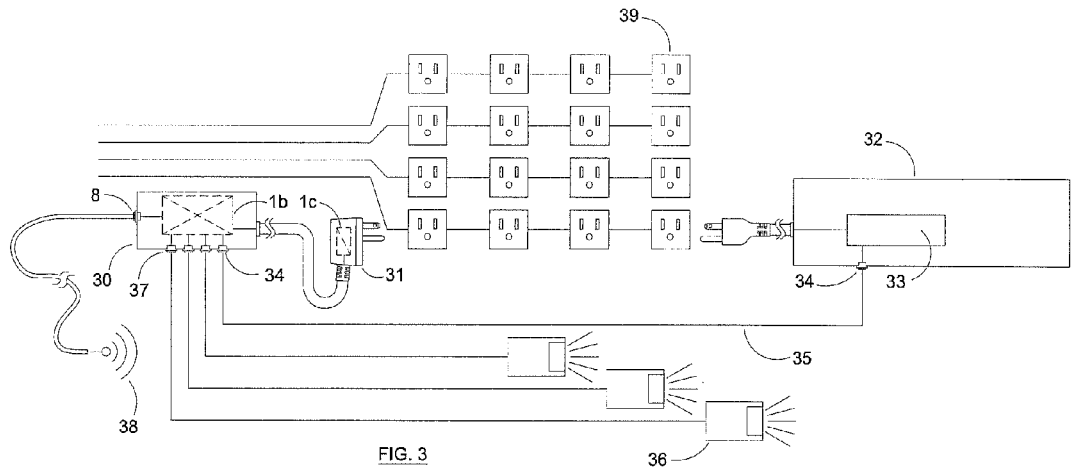
FIG. 3 is a schematic view of another controller system in accordance with another exemplary embodiment of the disclosure.

Referring next to FIG. 3, a portable control device 30 (similar to the control device 1 of FIG. 1, but without the switch circuit 1a) in a control system is shown to be powered by a cord and a remote plug-in power supply 31. The control device 30 provides dimming control of one or more controllable luminaires 32 via controller 1b, plug-and-play connectors 34 and plug-and-play cable 35 in response to sensors 36 (e.g. motion sensors) connected to the control device 30 via plug-and-play connections 37 and/or via transmissions from remote sensors, sensor networks and/or building energy management systems received via a plug-and-play receiver 38 (similar to receiver 2 of FIG. 1). This embodiment is particularly suitable for dimming portable luminaires (such as luminaire 32 in FIG. 3) in response to available daylight.

Figure 4:
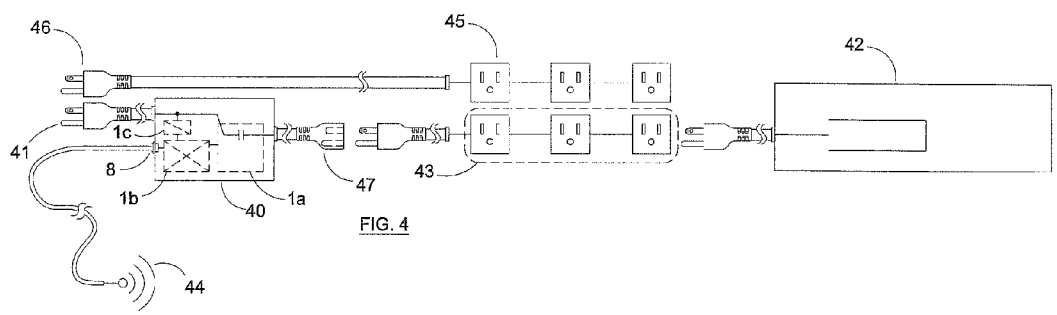
FIG. 4 is a schematic view of another controller system in accordance with another exemplary embodiment of the disclosure.

Referring to FIG. 4, another portable control device 40 (similar to the control device 1 of FIG. 1) in a control system is shown to be powered by a cord and plug 41. The control device 40 provides switching control of a single portable electrical appliance (such as portable luminaire 42) or a single circuit array of convenience power receptacles 43 typically found in portable office and classroom furniture via singular plug-and-play connector 47 and in response to transmissions from remote sensors, sensor networks and/or building energy management systems received via a plug-and-play radio receiver 44 (similar to the receiver 2 of FIG. 1).

Figure 5:
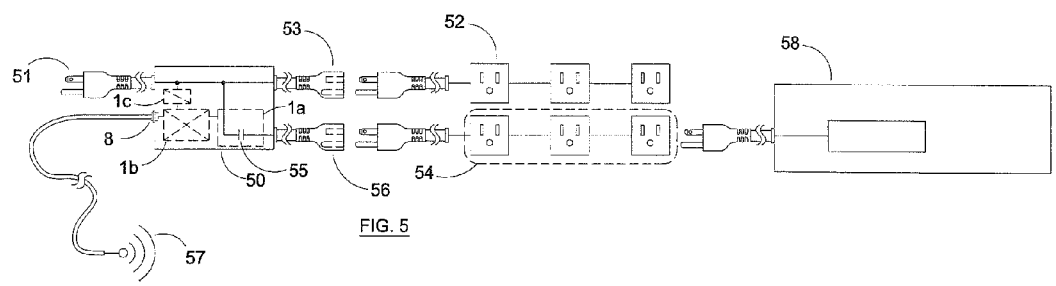
FIG. 5 is a schematic view of controller system in accordance with another exemplary embodiment of the disclosure.

Referring now to FIG. 5, a portable control device 50 (similar to the control device 1 of FIG. 1) in a control system is shown. The control device 50 is powered by a single cord and plug 51 and provides both unswitched power for one or more convenience power receptacles 52 (such as those provided in association with portable office furniture) via plug-and-play connector 53, and provides switching control of one or more similar convenience power receptacles 54 via switching relay 55 of switch circuit 1a and plug-and-play connector 56 in response to transmissions from remote sensors, sensor networks, and/or building energy management systems received via a plug-and-play receiver 57 (similar to receiver 2 of FIG. 1). It is noted that plug-and-play connectors 53 and 56 may be common power cord extension fittings or may be any connector configured to interface with modular receptacle arrays 52 and 54 in a portable furniture power system. Advantageous operation allows an appliance or plug load such as portable luminaire 58 to be switched on and off in response to local occupancy or time-of-day signaling received by control device 50 via receiver 57 when said appliance, luminaire, or plug load is powered via one of the convenience outlets of receptacle array 54.

Figure 6:
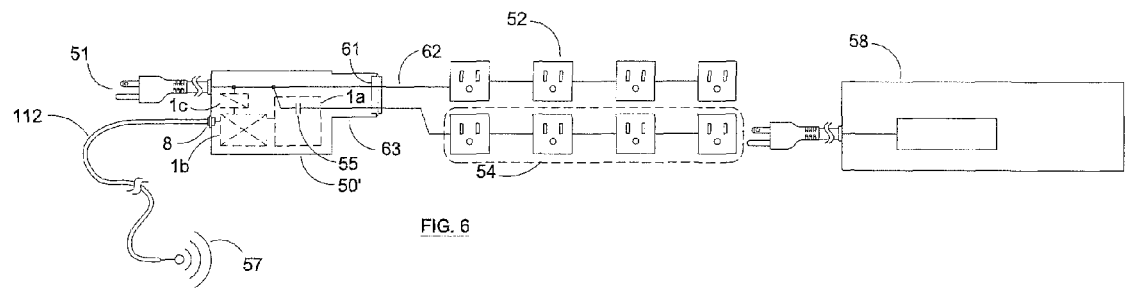
FIG. 6 is a schematic view of controller system in accordance with another exemplary embodiment of the disclosure.

Referring to FIG. 6, another exemplary embodiment of a control system is shown, wherein all items correspond to like numbered items in FIG. 5, and the plug-and-play connectors 53 and 56 are replaced by a single multi-circuit plug-and-play connector 61 that is configured to interface with multi-circuit modular wiring system 62. The system includes control device 50', which may be configured with an extended portion 63 that may constitute a multi-conductor cable assembly.

Figure 7:
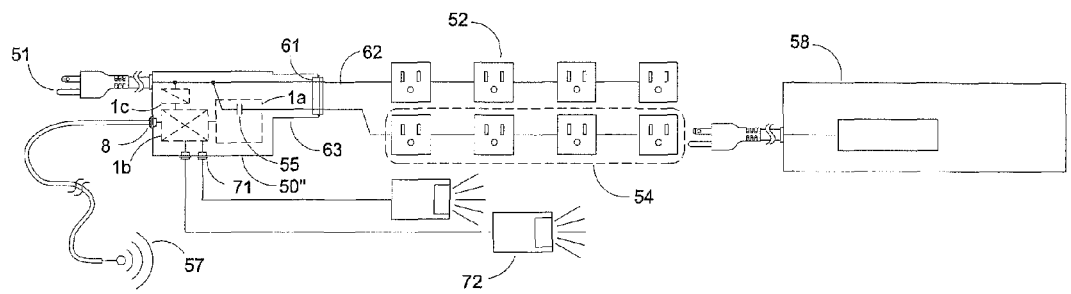
FIG. 7 is a schematic view of controller system in accordance with another exemplary embodiment of the disclosure.

Referring next to FIG. 7, another exemplary embodiment of a system is shown, wherein all items correspond to like numbered items in FIGS. 5 and 6, and plug-and-play connectors 71 are added to interface with one or more sensors 72 (e.g. motion sensors) such that control device 50" can provide switching control of receptacle array 54 in response to local sensor signals (e.g. motion sensing) in addition to, instead of, or in combination with radio frequency transmissions received via radio receiver 57.

Figure 8:
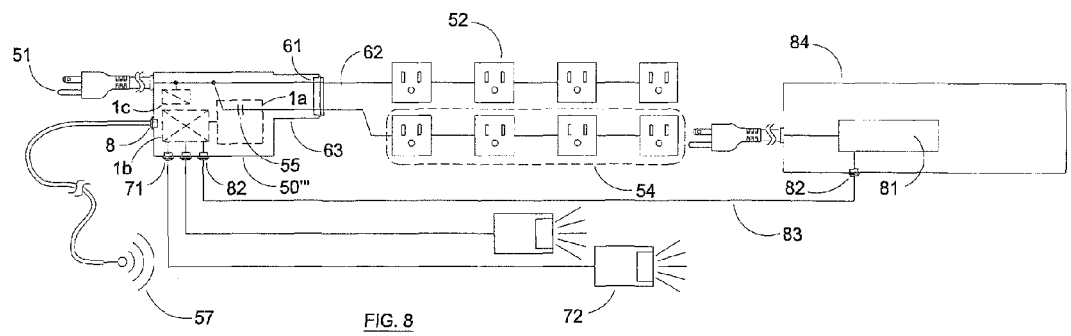
FIG. 8 is a schematic view of controller system in accordance with another exemplary embodiment of the disclosure.

FIG. 8 further illustrates another exemplary embodiment of a system is shown, wherein all items correspond to like numbered items in FIGS. 5-7. The system includes control device 50''', (similar to the control device 1 of FIG. 1), and plug-and-play connectors 82 being provided to interface with plug-and-play cable 83 to achieve dimming control of one or more controllable luminaires 84 in response to signals from local sensors 72 (e.g. motion sensors) in addition to, instead of, or in combination with radio frequency transmissions received via the receiver 57.

Figure 9:
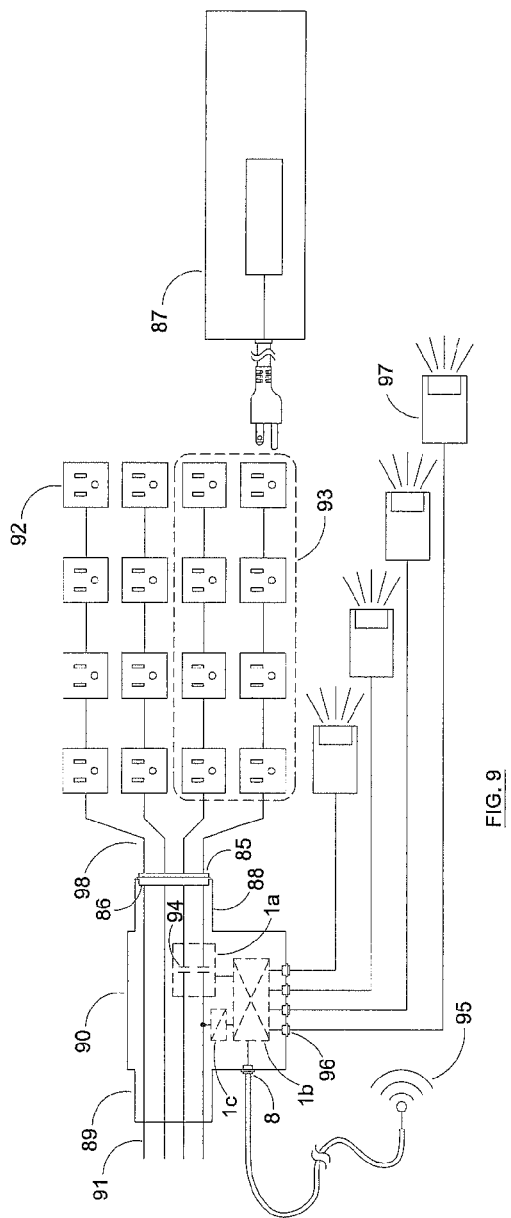
FIG. 9 is a schematic view of controller system in accordance with another exemplary embodiment of the disclosure.

With reference to FIG. 9, yet another exemplary embodiment of a control system is shown, wherein control device 90 (similar to the control device 1 of FIG. 1) is connected to multi-circuit building wiring 91 and provides both unswitched power for one or more convenience power receptacles 92 (such as those provided in association with portable office furniture) and switching control of one or more similar convenience power receptacles 93 via one or more switching relays 94 of switch circuit 1a in response to transmissions from remote sensors, sensor networks and/or building energy management systems received via a plug-and-play receiver 95 (similar to receiver 2 of FIG. 1) and in response to signals from local sensors 97 (e.g. motion sensors) via plug-and-play connectors 96. Furthermore, control device 90 may be configured to connect to a modular wiring system 98 via associating multi-circuit connectors 85 and 86, said connectors configured to associate one or more of the modular wiring system circuits 98 with switching relays 94 of controller 90 while connecting one or more of the modular wiring system circuits 98 directly to the building wiring 91 thereby providing a desirable mix of controlled convenience power receptacles 93 and uncontrolled convenience power receptacles 92. Advantageous operation allows an appliance or plug load such as portable luminaire 87 to be switched on and off in response to local occupancy or time-of-day signaling received by control device 90 via receiver 95 when said appliance, luminaire or plug load is powered via one of the convenience outlets of receptacle array 93. FIG. 9 also reveals that control device 90 may be configured with extended portion 88, extended portion 89, or both, which may constitute a multi-conductor cable assembly.

Figure 10:
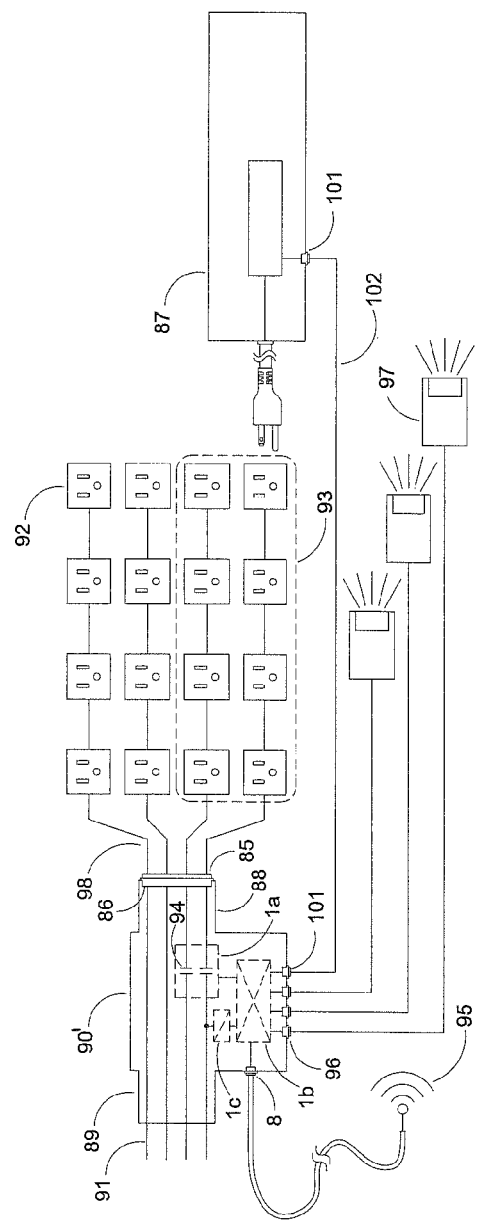
FIG. 10 is a schematic view of controller system in accordance with another exemplary embodiment of the disclosure.

Still further, FIG. 10 discloses another exemplary embodiment of a control system wherein all items correspond to like numbered items in FIG. 9. The system includes a control device 90' (similar to control device 1 of FIG. 1) and plug-and-play connector 101 that is provided to interface with plug-and-play cable 102 to achieve dimming control of one or more controllable luminaires 87 in response to signals from local sensors 97 (e.g. motion sensors) in addition to, instead of, or in combination with radio frequency transmissions received via the receiver 95.

Figure 11:
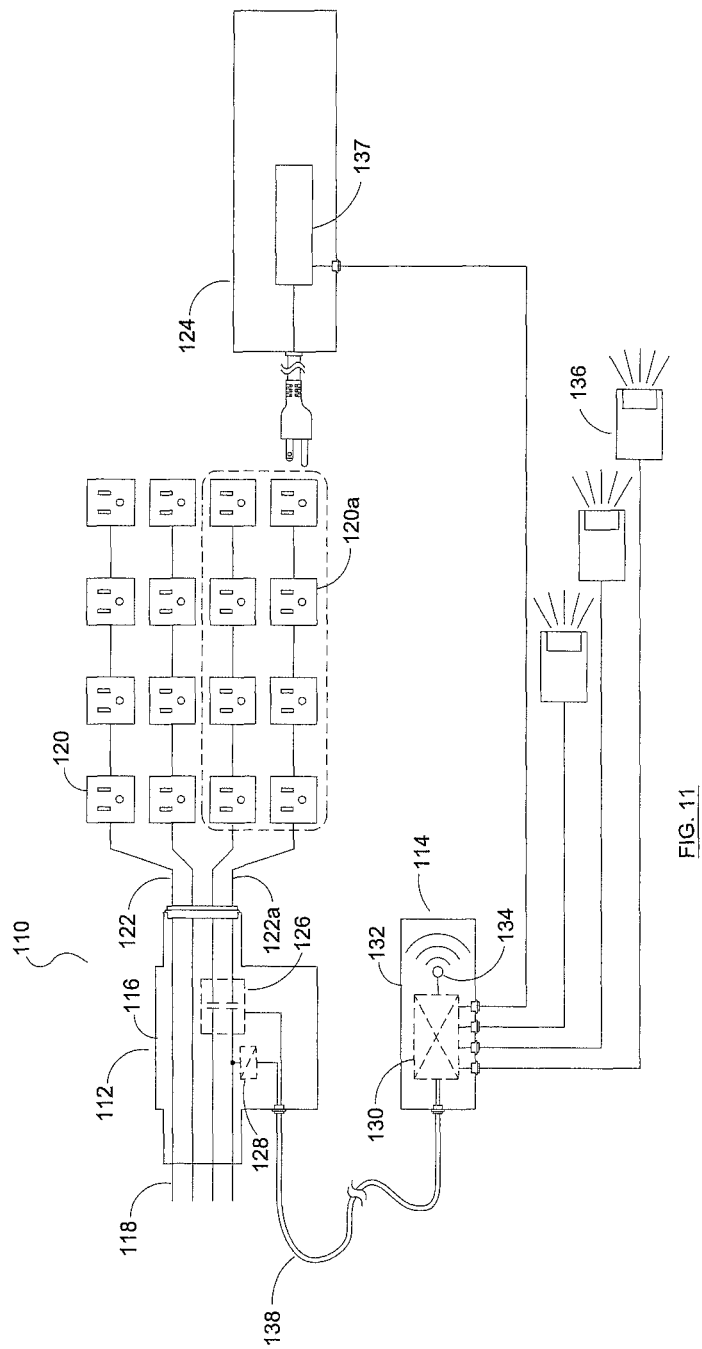
FIG. 11 is a schematic view of controller system in accordance with another exemplary embodiment of the disclosure.

Referring next to FIG. 11, another exemplary embodiment of a control system 110 is illustrated. As shown in the system 110 of FIG. 11, the control device 1 and receiver 2 shown in FIG. 1 (and shown similarly in FIGS. 2-10) are replaced by a first control device portion 112 disposed remotely of a second control device portion 114. Notably, it is contemplated by this disclosure that the first control device portion 112 and second control device portion 114 could replace any of the control devices and receivers (respectively) of FIGS. 1-10.

As shown in FIG. 11, the first control device portion 112, which is defined by a first portion housing 116, is configured for receiving power from the building via wiring 118, and is also configured to provide switched and unswitched power to at least one power output 120, 120a via wiring 122, 122a (the power outputs 120, 120a further provide power to plug load devices and portable luminaires such as luminaire 124). The first control device portion 112 also includes a switch circuit 126 (like circuit 1a of FIGS. 1-10) and auxiliary power supply 128 (like supply 1c of FIGS. 1-10) housed within the first portion housing 116. The switch circuit 126 allows the wiring 122a to provide switched power to the power outputs 120a (while outputs 120 receive unswitched power from output wiring 122).

Connected to the switch circuit 126 and auxiliary power supply 128 is a controller or circuit board 130 (like controller 1b of FIGS. 1-10). The controller 130 is disposed in the second control device portion 114 as defined by second portion housing 132. The controller 130 is connected to and receives signals from a radio frequency receiver 134 disposed within the second portion housing 132 or at least partially extending from the second portion housing 132 (for example via an antenna). Due to the nature of radio frequency signals, transmissions received by the receiver 134 and provided to the controller 130 may originate from devices located long distances from the controller 130 and luminaire(s) 124 and/or from devices that are separated from controller 130 by objects or constructions that are penetrable by radio frequency signals but cannot be penetrated by other signal types (e.g. infrared signals). The controller 130 may also receive signals from various sensors 136 (such as the wired, plug-and-play occupancy sensors plugged into the second control device portion 114 in FIG. 11), and send signals directly to the luminaire(s) 124 (such as to a controllable ballast 137 of a luminaire). This transmission of signals to the luminaire(s) 124 may occur via a wired plug-and-play connection as shown in FIG. 11, or via a wireless transmission from the receiver 134 should the receiver 134 be configured as a transceiver (which is contemplated by this disclosure). Similarly, any input received by the controller 130 (from the receiver/transceiver 134 or sensors 136), may be transmitted to other control system receivers (such as any of the receivers identified in the above described embodiments) deployed within radio signal range of receiver/transceiver 134, to control plug load power outlets connected thereto.

Notably, the exemplary embodiment of FIG. 11 shows the first control device portion 112 and the second control device portion 114 (and elements disposed therewith/therein) to connect and communicate via a plug-and-play wired extension 138 similar to the extension 7 of FIG. 1. It should be appreciated, however, that this wired extension may also be more permanently associated with the first control device portion 112 and the second control device portion 114, such that the connection would not be considered a plug-and-play connection.

It is additionally noted that, in any of the above or other exemplary embodiments, the aforementioned receiver may be a transceiver capable of transmitting signals from the controllers to other wireless enabled devices and/or building energy management systems.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A control system for use with one or more building power circuits, the control system comprising:
    a control device delimited by a control device housing, said control device being configured to receive power from said building power circuit(s) and provide power to at least one unswitched power output and at least one switched power output; and
    a receiver configured to receive radio frequency signals, said receiver being disposed remote of said control device housing and configured for removable wired connection with said control device,
    wherein said at least one switched power output is provided via at least one switching relay associated with said control device and in response to radio frequency signals received by said receiver.

2. The system of claim 1, wherein said removable wired connection is achieved via at least one quick-connect/quick-disconnect plugging connector.

3. The system of claim 1, wherein said control device is configured to deliver dimming signals via at least one quick-connect/quick-disconnect plugging connector in response to signals received by said receiver.

4. The system of claim 1, wherein said at least one unswitched and said at least one switched power outputs are provided via at least one quick-connect/quick-disconnect plugging connector.

5. The system of claim 1, wherein said at least one switching relay is configured to control said at least one switched power output in response to at least one sensor connected to said control device via a quick-connect/quick-disconnect plugging connector.

6. The system of claim 5, wherein said control device is configured to deliver dimming signals via at least one quick-connect/quick-disconnect plugging connector in response to signals received by at least one of said receiver and said at least one sensor connected to said control device.

7. The system of claim 1, wherein said receiver is a transceiver configured to also transmit signals from said control device.

8. The system of claim 1, wherein the control device receives power from the one or more building power circuits via at least one power transmitting quick-connect/quick-disconnect plugging connector.

9. The system of claim 1, wherein at least one luminaire is powered by said power output.

10. The system of claim 1, wherein at least one plug load receptacle is powered by said power output.

11. A control system for use with two or more building power circuits, the control system comprising:
    a first control device portion delimited by a first portion housing, said first control device portion being configured to receive power from said two or more building power circuits and provide power to two or more power output(s);
    a second control device portion delimited by a second portion housing remote of said first portion housing, wherein said second control device portion includes a receiver configured to receive signals, said second control device portion being in wired connection with said first control device portion;
    at least one switch circuit disposed in said first portion housing and configured to provide switched power to one or more of said at least two power outputs and unswitched power to at least one or more of said at least two power outputs; and
    a controller disposed in said second portion housing and connected to said receiver, said controller being configured for connection with and control of said switch circuit, via said wired connection and in response to said signals.

12. The system of claim 11, wherein said controller and said second control device portion are configured to receive input from at least one sensor.

13. The system of claim 11, wherein said controller and said second control device portion are configured to control at least one controllable ballast of at least one luminaire.

14. The system of claim 11, wherein said wired connection is achieved via at least one quick-connect/quick-disconnect plugging connector.

15. The system of claim 11, wherein said receiver is configured to receive radio frequency signals.

16. The system of claim 11, wherein said receiver is disposed inside of said second portion housing.

17. The system of claim 11, wherein at least a portion of said receiver extends from said second portion housing.

18. The system of claim 11, wherein said receiver is a transceiver configured to also transmit signals from said second control device.

19. The system of claim 11, wherein at least one plug load receptacle is powered by said switched power.

* * * * *